Jan. 17, 1967  S. T. CARTER  3,298,889
LABEL PICKER APPARATUS
Original Filed May 20, 1963  10 Sheets-Sheet 1

FIG. 1

INVENTOR.
SIDNEY T. CARTER
BY
Roberts Cushman Grant
ATT'YS

Jan. 17, 1967 S. T. CARTER 3,298,889
LABEL PICKER APPARATUS
Original Filed May 20, 1963 10 Sheets-Sheet 2

INVENTOR
SIDNEY T. CARTER
BY 
ATTORNEYS

United States Patent Office 3,298,889
Patented Jan. 17, 1967

3,298,889
LABEL PICKER APPARATUS
Sidney T. Carter, Shrewsbury, Mass., assignor to Geo. J. Meyer Manufacturing Co., Cudahy, Wis., a corporation of Wisconsin
Original application May 20, 1963, Ser. No. 281,624, now Patent No. 3,262,422, dated July 26, 1966. Divided and this application Oct. 21, 1965, Ser. No. 499,763
12 Claims. (Cl. 156—484)

This invention relates to label-applying apparatus and more especially to improved label-picking mechanism useful in a high-speed machine of the rotary type wherein successive bottles are spaced closely about a rotary table or turrent in approaching and receding from the label-applying point, this application being a division of the copending application for Letters Patent of the United Sates, Serial No. 281,624, filed by Sidney T. Carter on May 20, 1963, now Patent No. 3,262,422, for Apparatus for Applying Gum to a Label Picker.

The principal object of the present invention is to provide picker-actuating mechanism so designed as to avoid danger of interference between the picker in approaching the label-applying point and the bottle which has just received a label.

Other objects and advantages of the invention will be pointed out in the following more detailed description and by reference to the accompanying drawings wherein:

FIGS. 11 and 11a are views similar to FIGS. 8 and 9, respectively, but showing the pickers on their way down toward label-applying position, but still located forwardly as in FIGS. 10 and 10a;

Figure 1:
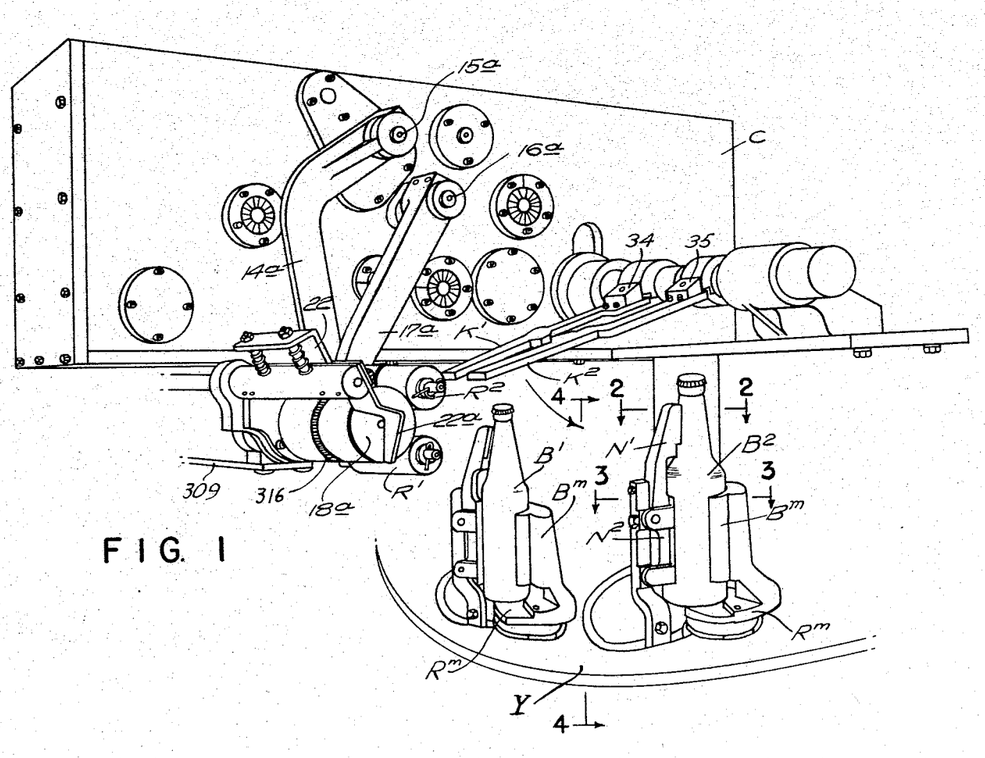
FIG. 1 is a fragmentary, perspective view (omitting the label magazine and certain other parts), showing the gum-applying apparatus of the present invention as embodied in a rotary or turret-type labeling machine, the two gum-applying or transfer rolls being shown at a time at which they are both closely adjacent to but spaced from the gum-supply or presenting roll, while the picker, having taken a label (not shown) from the magazine, is on its way to the transfer position.
Figures 2, 3, 4, 10, 10A:
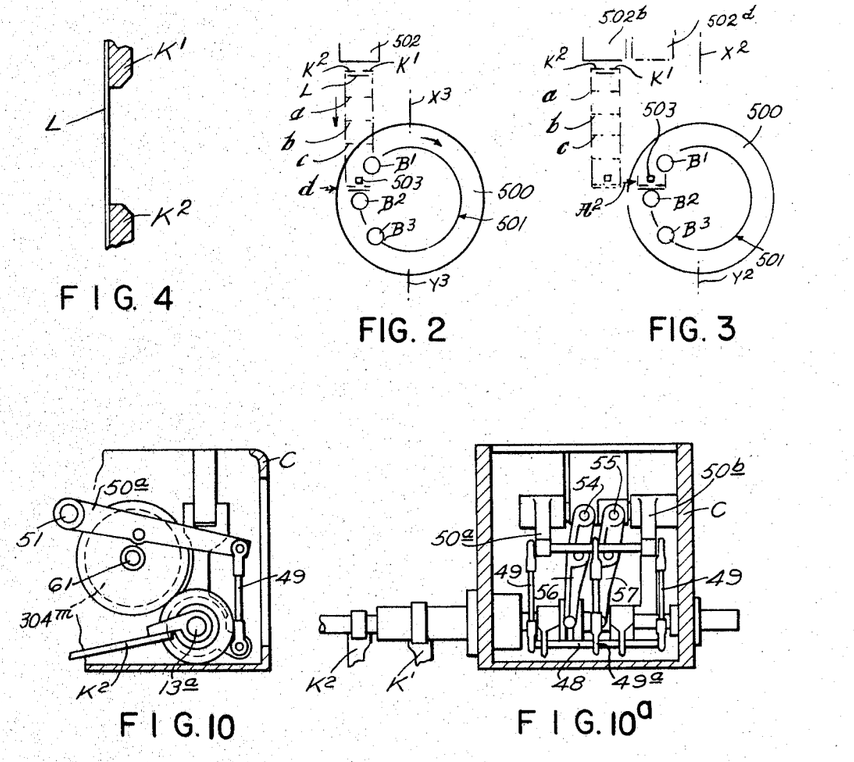
FIG. 2 is a diagram, showing the picker path in developed view, illustrative of the impracticability, in a high-speed rotary machine, of moving the picker in the conventional way in carrying a label from the magazine to the label-applying or transfer point.
FIG. 3 is a view similar to FIG. 2, but diagrammatically illustrative of the novel path of the picker in accordance with the present invention.
FIG. 4 is a fragmentary, transverse section, to larger scale, through the picker, showing a preferred form of blade, and with a label adhering to the faces of the blades.
FIGS. 10 and 10a are views similar to FIGS. 8 and 9, respectively, but showing the picker blades at the highest point in their path of travel, that is to say, in label-picking position, and as having moved forwardly with reference to the center line of a bottle disposed in label-receiving position.

The apparatus of the present invention includes a gum box Z (FIG. 2) for holding liquid gum, having therein a gum-elevating roll 20 which picks up gum from the box and applies it to the peripheral surface of a constantly rotating gum-supply or presenting roll 18a (FIGS. 1 and 2). From the roll 18a gum is taken by two independent rotary transfer rolls $R^1$ and $R^2$ (FIGS. 1, 2 and 3), one of which receives gum from the roll 18a and applies it to the picker during one picker cycle, while the other transfer roll takes gum from the supply or presenting roll 18a and applies it to the picker during the following cycle, the means for actuating the picker and the two transfer rolls being so devised that one transfer roll may be receiving gum from the gum-supply or presenting roll, while the other transfer roll is applying gum to the picker, and vice versa.

While of broader utility, the label-picking and gum-applying machanism of the present invention is here illustrated and described with particular reference to its application to a lebeling machine of the rotary type.

Figure 5:
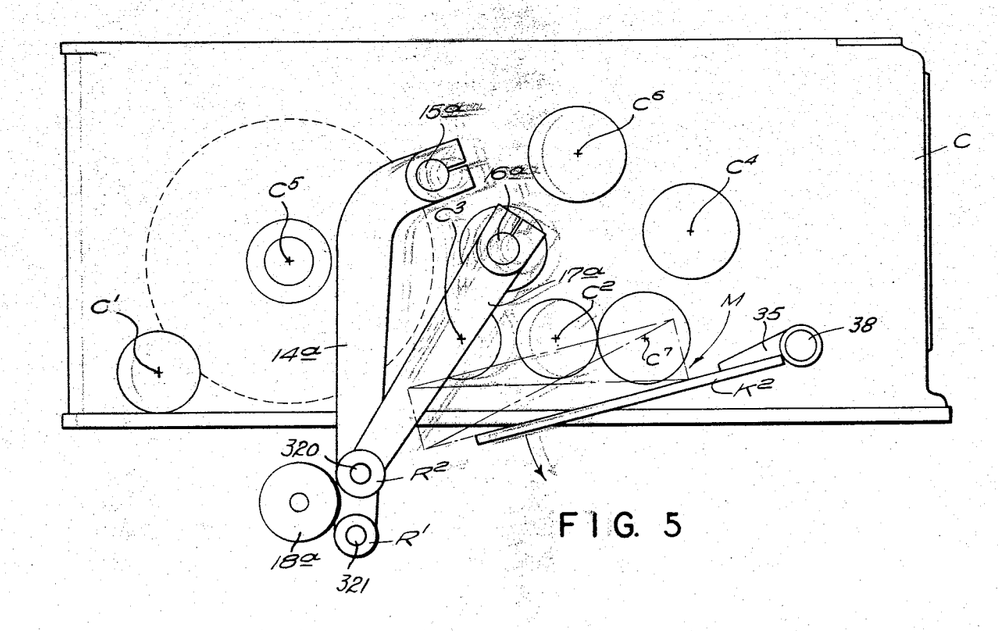
FIG. 5 is a diagrammatic front elevation, omitting many parts, merely to illustrate the relative locations of the picker, the magazine, the gum-supply or presenting roll and gum-transfer rolls, and the centers of certain shafts of a commercial embodiment of the invention.

Referring to FIG. 5, there is diagrammatically shown, in side elevation, a casing or housing C for the gears and actuating cams for the gum-transfer rolls and picker. This casing supports bearings for the several shafts involved in driving the operative parts. Thus, the gum-transfer rolls $R^1$ and $R^2$ are here shown as carried, respectively, by a long lever arm 14a and a relatively shorter lever arm 17a, these arms being fixed to rock shafts 15a and 16a respectively. The gum-supply or presenting roll is diagrammatically indicated at 18a; and the position of the label magazine is indicated by broken lines at M; and one end of the picker shaft appears at 38. The centers of certain other shafts, hereafter to be referred to, are indicated at $C^1$, $C^2$, $C^3$, $C^4$, $C^5$ and $C^6$, respectively.

In FIG. 1 the casing or housing C is shown, merely by way of example, as associated with a labelling machine of the rotary or turret type above referred to, comprising the horizontal table Y which is turned by mechanism (not here illustrated), and upon which is mounted a series of bottle carriers $Rm$, each having a bottle-steadying bracket $Bm$ which holds the bottle in upright position and prevents it from tipping in response to the pressure of the label-pressing pad. Associated with each holder there is a grip-finger device comprising, as here shown, upper and lower parts $N^1$ and $N^2$ designed, respectively, to press the neck and body labels, delivered by the picker, against the bottle.

The picker is of the separable blade type comprising the blades $K^1$ and $K^2$ which, when separated, hold the label by its ends so that the label extends transversely of the bottle path and is thus contacted by the moving bottle.

Merely by way of example, the table Y may be driven at approximately 130 r.p.m. and may support five bottle carriers B$m$, uniformly spaced so that adjacent bottles are spaced 9.75 inches on centers.

In order to permit high-speed in a machine in which the bottles are carried by a rotating table, as indicated in FIG. 1, it is necessary to keep the center-to-center distance between bottles as small as possible thus reducing bottle velocity and the effects of centrifugal force. Under such conditions, where the bottles follow each other very closely in carrying a label from the magazine to the label-applying point, if the magazine were so located that the picker would move down from the magazine in the usual path in placing the label in tangent relation to the surface of a bottle at the label-applying position, the inner blade $K^1$ of the picker would contact the previously labeled bottle before the latter would clear the picker path. Thus, for example, referring to the diagram of FIG. 2, the numeral 500 diagrammatically indicates, in plan, a rotary bottle-conveying table such as is employed in a high-speed rotary machine, showing the bottle path at 501 and indicating three successive bottles at $B^1$, $B^2$ and $B^3$, the bottle $B^1$ having received a label, the bottle $B^2$ being in position to receive a label, and bottle $B^3$ being on its way to the label-applying point. The numeral 503 designates a grip-finger device which holds the label in contact with the bottle after the label has been brought to the label-applying position by the picker. The label magazine is indicated at 502 and a picker comprising the two separable blades $K^1$ and $K^2$ is shown as just having taken a label L from the magazine and as ready to move along a rectilinear path, indicated by dotted lines, wherein several successive positions of the picker are indicated, for example, at $a$, $b$, $c$ and $d$, the latter being the position of the picker where it holds the label in readiness to be contacted by the approaching bottle.

However, inspection of this diagrammatic view shows that as the picker moves from point-to-point along the path indicated, the labeled bottle $B^1$ will not have advanced far enough to clear the blade $K^1$ of the picker so that such an arrangement as that illustrated in FIG. 2 would be impractical.

It may be noted at this point that (merely for ease in illustration) the magazine 502 (FIG. 2) is shown as so positioned that the picker may move from the magazine to the label-applying point with its blade always in a vertical plane. However, in the actual machine, the magazine would be above the table 500 and the picker would swing in an arcuate path from a position, in which its blades would be approximately horizontal to take a label from the bottom of the magazine, and would then become vertical as they move toward the label-affixing point.

To avoid the situation illustrated in FIG. 2, the label magazine of the present invention is spaced forwardly or outwardly from the machine frame so as to allow the picker, as hereafter more fully described, and, after taking the label, first to move down in a path such that the inner blade of the downwardly moving picker clears the bottle which has just been labeled, but then, immediately before the bottle next-to-be labeled arrives at the label-applying position, the picker moves bodily inward so as properly to locate the label relatively to the bottle. After the label has been affixed to the bottle, the picker again moves outwardly and upwardly toward the magazine. Thus, referring now to the diagram of FIG. 3, an arrangement is shown which is substantially like that of FIG. 2, except that the magazine has been moved from the former position (indicated in broken lines in 502$d$), to the position 502$b$, that is to say, it has been moved outwardly or further away from the center line $X^3$–$Y^3$ of the rotary table. With this arrangement the picker, still comprising the separable blades $K^1$ and $K^2$, first moves along a rectilinear path, moving from point-to-point, as indicated at $a$, $b$ and $c$, but just before arriving at the label-applying position (which was indicated at $d$ in FIG. 2), the picker, comprising both blades $K^1$ and $K^2$, moves bodily, as shown by arrow $A^2$ toward the center line $X^2$–$Y^2$ of the machine table, thus dodging the bottle $B^1$ which has just been labeled, and also the approaching label grip-finger 503, so that the picker blades $K^1$ and $K^2$, carrying the label, have thus been interposed between the bottle $B^2$ and the grip-finger 503 and without interference with another part. The blades $K^1$ and $K^2$, as above described, separate, just an instant after the bottle touches the label sufficiently to permit passage of the bottle, so that the bottle, by contacting the center part of the label, pushes the label though the space between the inner edges of the picker blades, the midportion of the label being pressed firmly against the bottle by the grip-finger 503, while the bottle advances and the grip-finger recedes thus stripping the opposite ends of the label from the picker blades.

As the bottle passes the label-applying position, the picker moves outwardly and upwardly to its original position in readiness to take another label from the magazine.

By an arrangement embodying the principle illustrated in FIG. 3, it is practicable to space successive bottles more closely than has been possible previously in rotary-type machines, thus allowing the employment of a table of relatively small diameter which may be driven at unusually high angular velocity without developing excessive centrifugal force such as to cause the bottles to tip.

Figure 7:
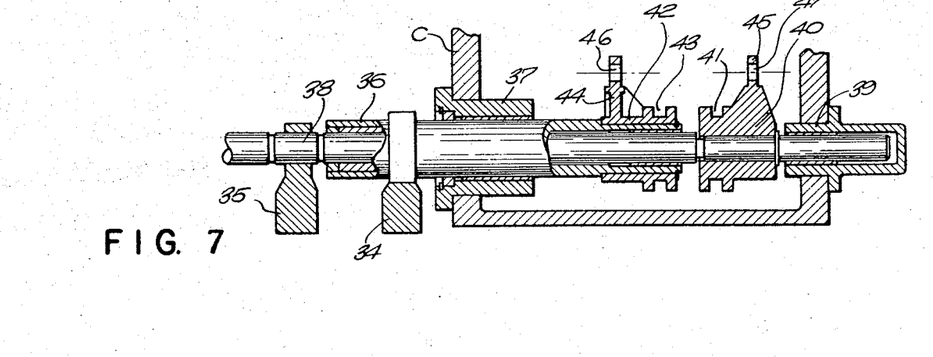
FIG. 7 is a fragmentary section, to larger scale, on the line 7—7 of FIG. 6.

The two picker blades $K^1$ and $K^2$ (FIGS. 1, 8 and 9), respectively, are secured to parts 34 and 35 (FIGS. 7 and 9), the part 34, which carries picker blade $K^1$ being fixed to a tubular shaft 36 (FIG. 7), one end of which is mounted to turn in a bearing 37 fixed in an opening in the wall of the housing or casing C, while the part 35, which carries the picker blade $K^2$, is fixed to a solid shaft 38, part of which telescopes within the tubular shaft 36 and whose opposite end (remote from the part 35) is arranged to turn and slide in a bearing 39 (FIG. 7) mounted in an opening in the wall of the casing.

Figures 1A, 13, 15, 15A:
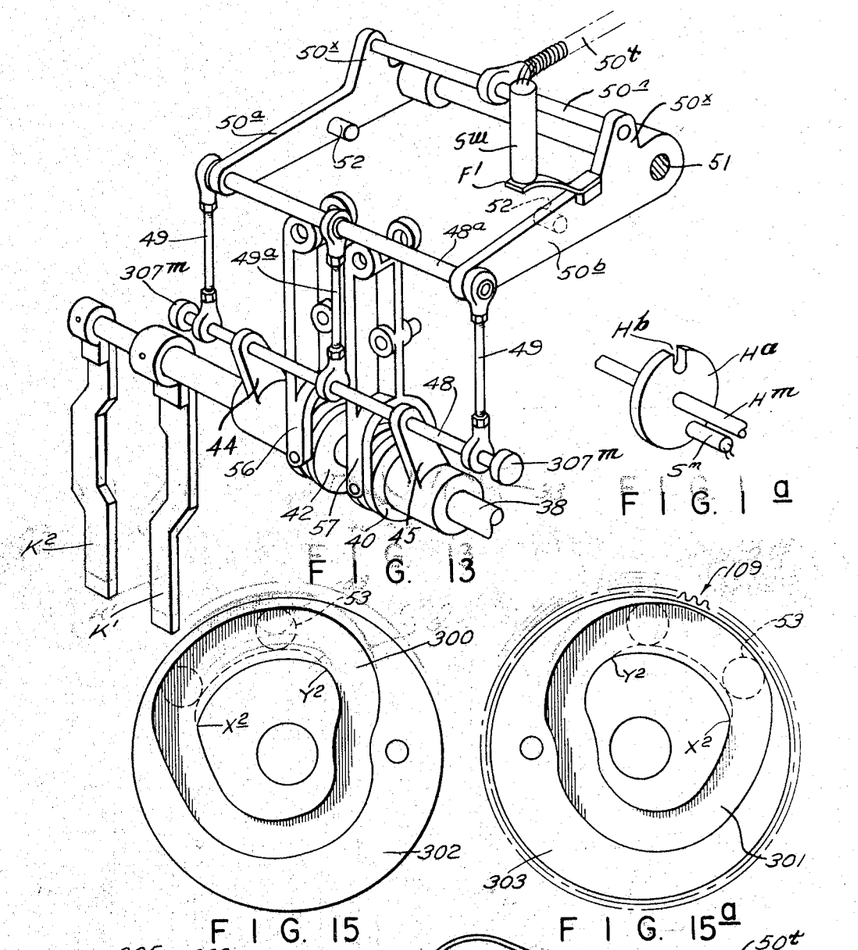
FIG. 13 is a fragmentary perspective view showing a part of the picker-actuating mechanism as it appears when the pickers are located at label-applying position, and illustrating a safety device operative to prevent breakage of parts as a result of a displaced bottle.
FIGS. 15 and 15a are elevations of the two cams which act simultaneously to rock the pickers up and down, these cams being located at opposite ends, respectively, of the barrel cam shown in FIG. 14.
Figure 6:
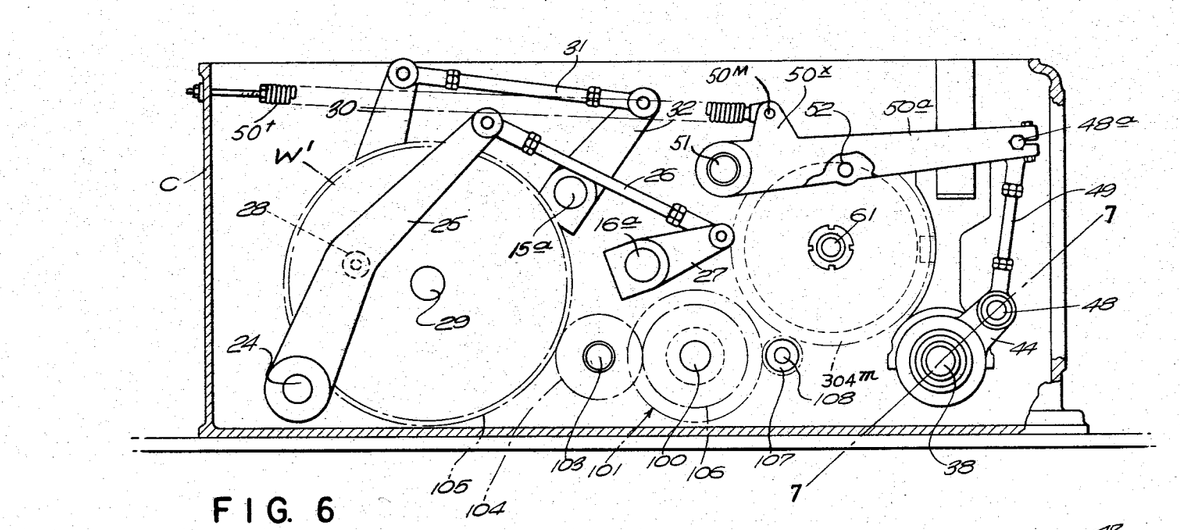
FIG. 6 is a vertical, longitudinal section through the casing or housing for the gears and cams which actuate the gum-transfer rolls and picker, with some parts broken away, and showing the several shafts in end elevation and diagrammatically indicating the locations of some of the cams.
Figures 8, 9:
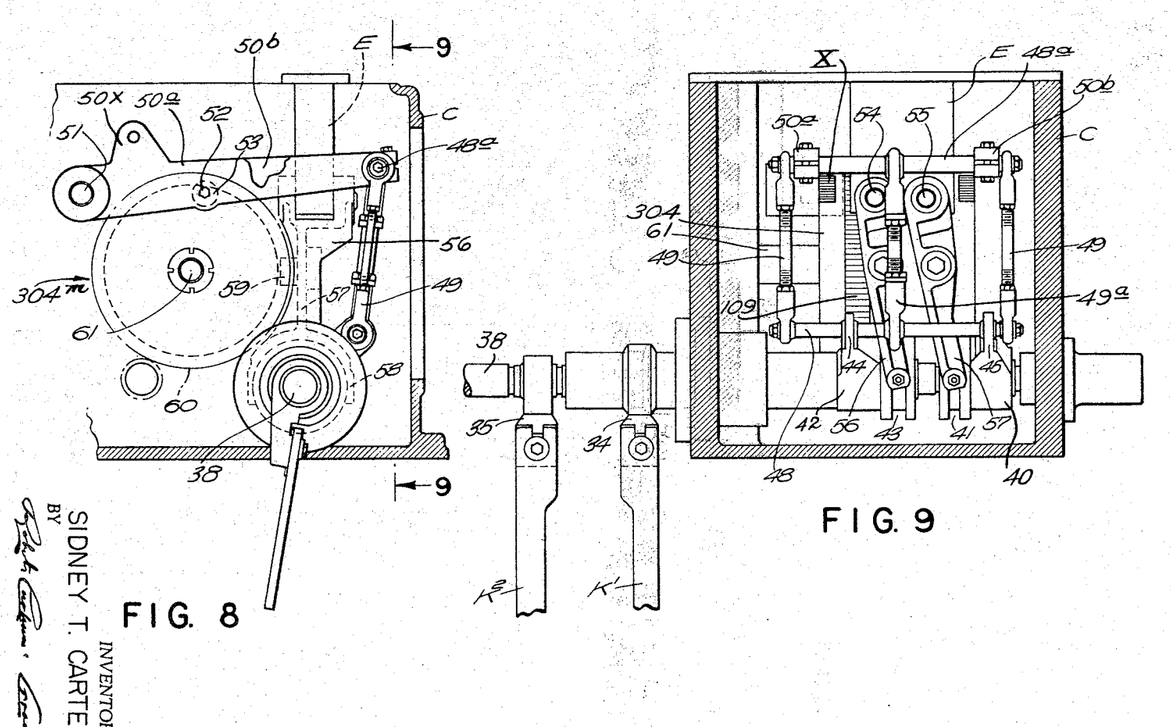
FIG. 8 is a fragmentary, vertical section through the casing which houses the mechanism for actuating the gum-transfer rolls and picker, the picker shaft being shown in end elevation with the picker at the lowest point of its travel.
FIG. 9 is a section through the same casing, showing the means for moving the picker blades laterally, the section being substantially on the line 9—9 of FIG. 8.
Figure 11:
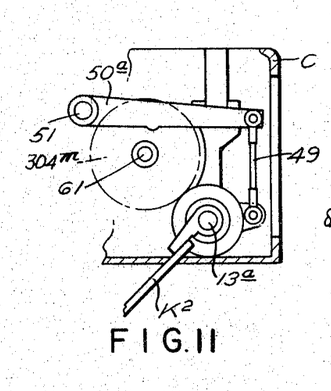
Figure 11A:
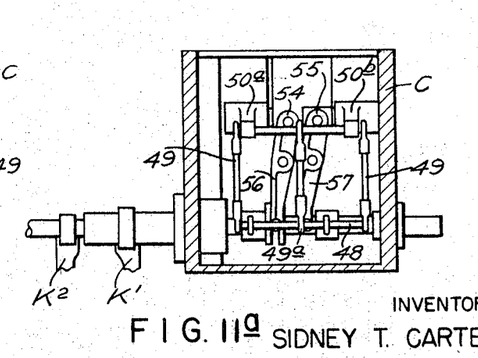
Figure 14:
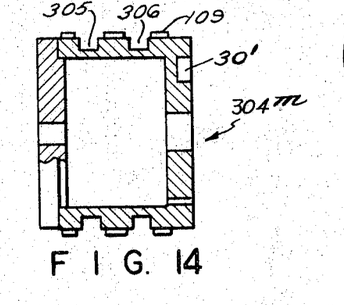
FIG. 14 is a diametrical section through the barrel cam which moves the picker blades laterally and toward and from each other.

A sleeve 40 (FIG. 7), having a peripheral groove 41 and a radial arm 45, is so fixed to the shaft 38 that axial motion of the sleeve produces corresponding axial motion of the shaft, while rotational movement of the sleeve 40, about the axis of the shaft, causes the shaft to rock. A sleeve 42 of generally corresponding type is fixed to the tubular shaft 36, this sleeve 42 having the peripheral groove 43 and the radial arm 44. The arms 44 and 45 of the two sleeves have aligned holes 46 and 47 (FIG. 7) in which are secured antifriction bearings which receive an elongate rigid rod 48 (FIGS. 6, 9, 10$a$, 11$a$ and 13) to whose opposite ends are pivotally attached the lower ends of rigid links 49 (FIGS. 6, 9, 10$a$, 11$a$ and 13), whose upper ends are pivotally connected to an elongate rigid rod 48$a$. The rod 48$a$ turns in spaced bearings fixed in the free ends of levers 50$a$ and 50$b$ (FIG. 8) which rock about the center $C^6$ (FIG. 5) on a supporting shaft 51 (FIGS. 6, 8 and 13). A third rigid link 49$a$ (FIG. 13) is pivotally connected at its upper and lower ends, respectively, to the rods 48$a$ and 48. Each of the levers 50$a$ and 50$b$ is provided, intermediate its ends, with a stub shaft 52 on which there is is mounted a cam follower roll 53 (FIGS. 8, 15 and 15$a$), these cam follower rolls engaging cam grooves 300 and 301 respectively, in cams 302 and 303 (FIGS. 15 and 15a) at the opposite ends of a barrel cam 304m (FIG. 14), having peripheral grooves 305 and 306 and which is fixed to the shaft 61, said barrel cam having peripheral teeth constituting a gear 109.

By means of the above-described mechanism, the picker blades K¹ and K² are rocked in properly timed relation to the other parts of the machine. Desirably, the rod 48 (FIG. 9) is provided at each end, respectively, with restraining means, for example a shoe 307m (FIG. 13) which slides in contact with a flat vertical surface (not here illustrated) of the machine frame thereby to prevent rod 48 from moving endwise, although permitting it to move freely up and down.

Figure 16:
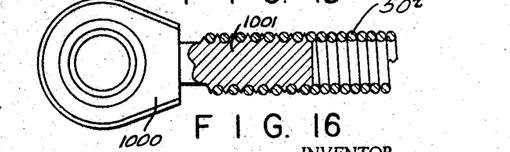
FIG. 16 is a fragmentary view, showing one end of the picker control spring.

Each of the lever arms 50a and 50b has an upstanding lug 50x (FIGS. 8 and 13) near its pivoted end. A rigid rod 50m, connecting these lugs, provides anchorage for one end of a long tension spring 50t (FIGS. 6 and 13) whose other end (FIG. 6) is anchored to the wall of the housing C. One desirable means for attaching the end of such a spring to another part, for example the rod 50m, is by providing an anchored member for the end of the spring such, for example, as the part 1000 (FIG. 16), having a shank 1001 provided with a screw thread of a special configuration adapted to make screw-threaded engagement with the spires of the spring, thus providing a secure connection without creating force causing transverse deflection of the spring.

The spring 50t, as thus arranged, tends to hold the levers 50a and 50b upwardly and thus to swing the picker blades downwardly toward the label-applying position.

A fixed support E (FIG. 8), forming a part of the casing C, carries parallel stub shafts 54 and 55 (FIG. 9) on which are mounted lever arms 56 and 57, respectively, each of these lever arms having a forked lower end 58 (shown in dotted lines in FIG. 8), which is received in one of the grooves 41 or 43, respectively, in the sleeves 40 and 42 (FIG. 7) above described. Each of these lever arms 56 and 57 is provided with a cam follower roll 59 (such as is indicated in FIG. 8), for engagement with one of the grooves 305, 306 (FIG. 14), respectively, in the periphery of the barrel cam 304 m, which is mountedd on the shaft 61, whose center is at the point C⁴ (FIG. 5). As this barrel cam rotates the lever arms 56 and 57 are so moved as to cause the sleeves 40 and 42 to move relatively to each other in a direction parallel to the axis of the shaft 38.

At this point, it is to be noted that the label magazine is located, as suggested in the diagrammatic view (FIG. 3) at such a distance outwardly from the front wall of casing C, that the picker, after taking a label, may move downwardly near the label-affixing position without contacting a labeled article on the rotary table Y.

Figure 12:
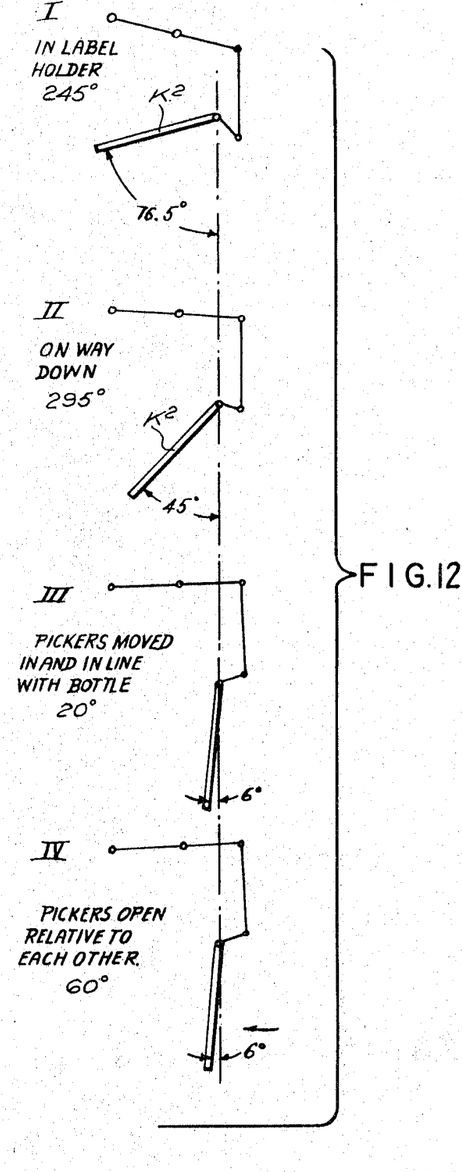
FIGS. 12 and 12a are diagrammatic illustrations showing the pickers, in edge and rear views, respectively, in various positions which they occupy druing a single picking cycle.
Figure 12A:
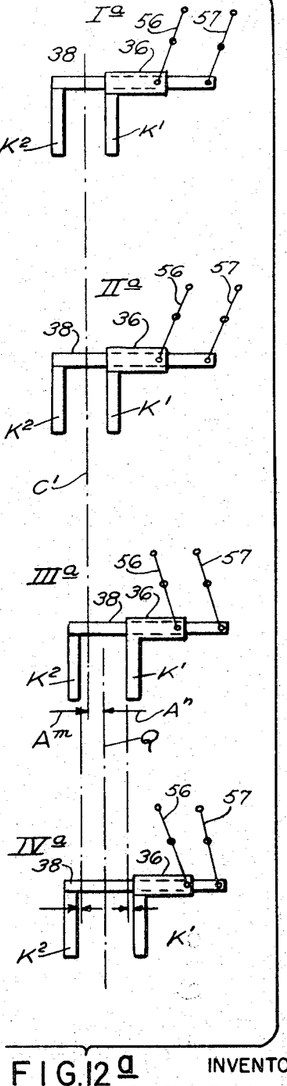

The cam grooves 305 and 306 in the barrel cam 304m (FIG. 14) are so contoured that when the picker is taking a label from the magazine, the proximate edges of picker blades K¹ and K² are at their nearest point of approach, then being in the relative position designated at I and Ia in FIGS. 12 and 12a. As the picker moves down from the magazine carrying a label, the contour of the grooves 305 and 306 in the barrel cam is such that the blades K¹ and K² remain in the same relative position, as shown at I and Ia (FIGS. 12 and 12a), until the picker has moved, for example, approximately one-half way down toward the label-applying point, the relative positions of the parts then being diagrammatically shown at II and IIa (FIGS. 12 and 12a). When the picker is but a short distance from the label-applying point, both blades are shifted inwardly, that is, toward the casing C. Thus, as indicated at IIIa (FIG. 12a), the blades K¹ and K², although remaining at the same distance apart, have both moved bodily to the right (as viewed in FIG. 12a) by the amount suggested by the space between the arrows Am and An, so that now the picker blades are disposed at equal distances, respectively, from the center line Q, indicating the vertical plane of the axis of the bottle to be labeled, as it stands in the label-receiving position.

As the picker reaches the label-applying or affixing position the blades K¹ and K² are caused, by the grooves of the barrel cam, to move further apart as shown at IVa (FIG. 12a), so as to permit the bottle to pass between them and the blades remaining in this relative position as the picker starts to move upwardly toward the magazine. At convenient times in its upward travel, the actuating cams shift both blades laterally in the same direction and then cause them to approach so that the picker may again enter the label magazine in readiness to take another label.

The amount of bodily movement of the picker in shifting laterally from label-picking position to label-affixing position would necessarily vary according to the size of the article to which the label is to be applied. For instance, for pint bottles this lateral motion may be of the order of 1½ inches, while for quart bottles the lateral motion may be 2 inches. To accomplish this result, interchangeable cams of the proper contours would be supplied.

The numeral 100 (FIG. 6) designates the main drive shaft of the gum-applying apparatus, this shaft being journaled in suitable bearings carried by the opposite walls of the casing. As here shown (FIG. 6), the shaft 100 carries a gear 106, integral with a sleeve 106x keyed to the shaft 100. A gear 101 is so clamped to a peripheral flange 101x on said sleeve, that it may be adjusted angularly relatively to the sleeve and shaft. The gear 106 meshes with the gear 104 on the shaft 103, the latter turning in bearings carried by the side wall of the casing C. The gear 104 meshes with the teeth 105 on the cam W², as above described, which is fixed to the shaft 29. The gear 101 meshes with a gear 107 mounted on a shaft 108 having bearings in the opposite walls of the casing C, the gear 107 also meshing with a gear 109 on the barrel cam 304m which moves the picker blades laterally.

The provision for angular adjustment of gear 101 relatively to shaft 100, as above described, makes possible the relative adjustment of the cams W¹ and W² which actuate the transfer rolls and the barrel cam 304m which actuates the picker, thereby to insure accuracy of timing of the picker and the gum-transfer rolls.

Because shaft 61 makes two revolutions for each single revolution of shaft 29, the picker performs two cycles for each one revolution of the cams which actuate the transfer rolls. This is suggested in FIGS. 17 and 17b, where the upper and lower rows of numerals below the graphs indicate the relative angular positions of the picker cams and the cams for actuating the transfer rolls respectively.

Figure 17:
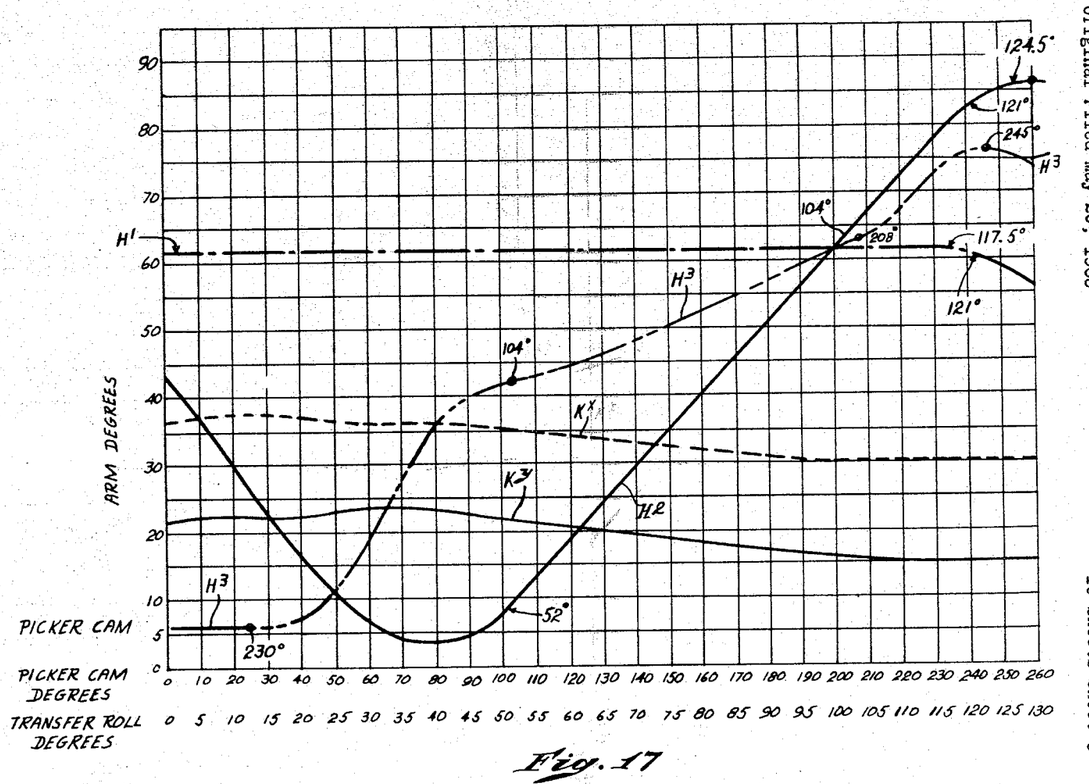
FIGS. 17, 17a and 17b are, respectively, portions of a graph indicating the relation of the motions of the two gum-transfer rolls and the picker.
Figure 17A:
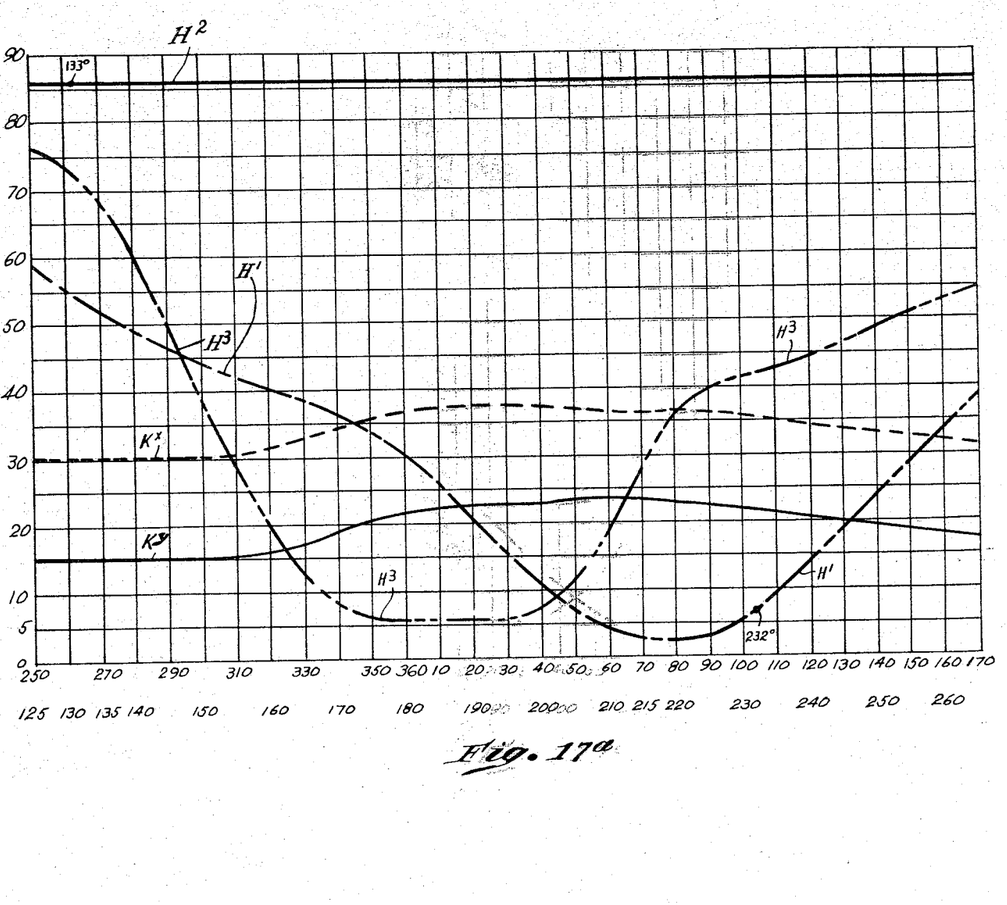
Figure 17B:
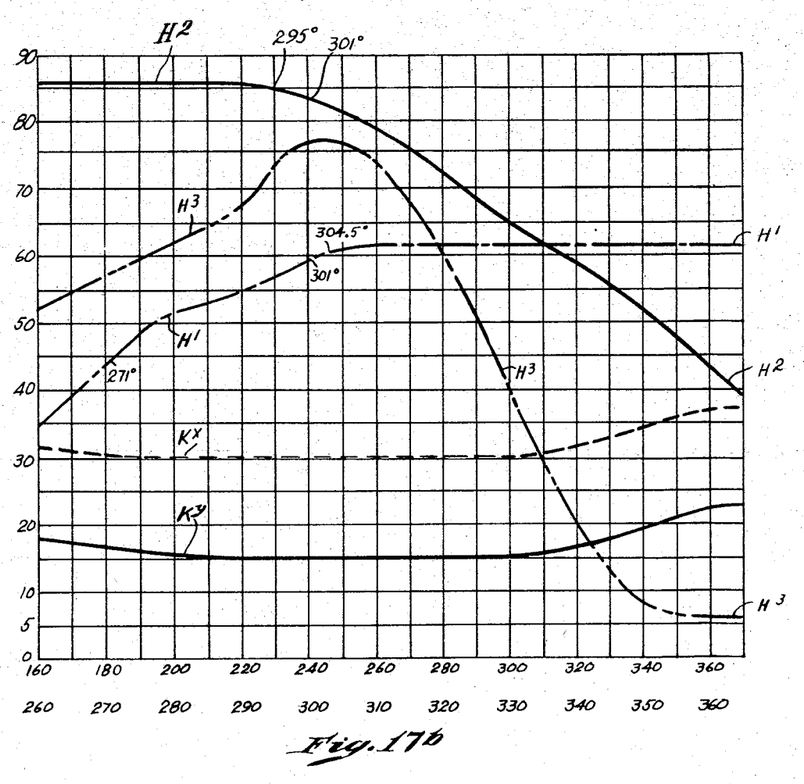

The diagram of FIGS. 17, 17a and 17b graphically indicate the sequence of events during two successive revolutions of the cam which rocks the picker. In this graph, and referring to the lower row of numerals at the bottom of the figures, the line H² indicates the angular positions of the arm which carries the transfer roll R² during two successive cycles of the picker; the line H¹ shows corresponding angular positions of the arm which carries the transfer roll R¹; and the line H³ shows corresponding angular positions of the picker. The line Kx indicates the side or lateral motion of picker blade K², while line Ky indicates the side or lateral motion of picker blade K¹ at 10° intervals during said successive rotations of the picker cam.

Referring to FIGS. 17, 17a and 17b, let it be assumed that at zero degrees of the first revolution of the picker cam (FIG. 17) (see the upper row of numerals at the bottom of the figures), the blades K¹ and K² of the picker are substantially vertical (actually 6° from the vertical), and spaced apart so that the bottle B² (FIG. 12a) has been able to pass between them and contact the gummed label carried by the picker blades. At approximately 23° of the first revolution of the picker cam, the picker begins to swing upwardly and having received gum from the transfer roll R² and having moved forwardly into registry with the magazine and having taken a label, starts down at approximately 245° of the first revolution of the picker cam (FIG. 12). The picker, carrying a label, first moves in a path, such as above described (FIG. 3), so as to avoid the bottle B¹ which has just received a label but then moves rearwardly at about 20° of the second picker cycle to register with the bottle which is about to be labeled. At about 60° of the second revolution of the picker cam (FIG. 17a), the picker blades separate (FIG. 12), to permit the bottle B² to pass between them and take the label. The parts are now disposed in the same relative positions as at the beginning of the first revolution of the picker cam.

While one desirable embodiment of the invention has herein been disclosed by way of example, it is to be understood that the invention is broadly inclusive of any and all modifications falling within the terms of the appended claims.

I claim:

1. In combination, in a labeling machine, a magazine, a separable blade picker comprising a pair of blades disposed in the same plane, a rock shaft on which said blades are mounted, means for rocking the shaft thereby, cycle-after-cycle, to move the blades from the magazine to a label delivery position, means for sliding the blades toward and from each other along the shaft during each cycle, and means for sliding both blades simultaneously along the shaft first in one direction and then in the other during each cycle.

2. In combination, in a labeling machine, a magazine, a separable blade picker comprising a pair of blades disposed in the same plane, a rock shaft on which said blades are mounted, means for rocking the shaft thereby, cycle-after-cycle, to move the blades from the magazine to a label delivery position, and means operative to slide both blades simultaneously along the shaft, while carrying a label received at the magazine, and for thereafter sliding both blades simultaneously along the shaft in the opposite direction, while still carrying the label, thereby to deliver the label at the label delivery point.

3. In a labeling machine, in combination, a picker for transferring labels from a magazine to a label delivery point, said picker comprising a pair of coplanar, relatively movable blades, a rock shaft on which said blades are mounted, means operative, at times, to move the blades oppositely to each other relatively to the axis about which they rock, and, at other times, to move said blades simultaneously in the same direction along the axis about which they rock.

4. In a labeling machine, in combination, a magazine for labels, a picker for transferring a label from the magazine to a label delivery point, the picker comprising separable coplanar blades, means for moving the blades toward and from each other, and means for moving the picker bodily, after having taken a label from the magazine, in one direction along a path parallel to the plane of the label, then in a direction perpendicular to the plane of the label, and then oppositely to the first-named direction along a path parallel to the plane of the label to the label delivery point.

5. In combination, in a labeling machine wherein articles to be labeled are advanced uninterruptedly along a circular path past a label-affixing point, and wherein a picker rocks about an axis which is substantially parallel to that radius of said path which passes through said label-affixing point, and wherein a label magazine, spaced from the label-affixing point, holds a label in readiness to be taken by the picker, characterized in that the label magazine is so located that a vertical plane through the center of the exposed label in the magazine is spaced further from the axis of the article path than is a parallel plane which is tangent to that radius of said path which passes through the affixing point, and means whereby, in transferring a label from the magazine to the affixing point, the midpoint of the picker is first moved in said first-named vertical plane until the picker has cleared the last article which has received a label and is then moved radially inward of the article path until its midpoint is in the article path.

6. Gum-applying apparatus of the kind which comprises a picker and means for applying gum to the picker and wherein the picker comprises two separable blades disposed in edge-to-edge relation, and means for so supporting and actuating the blades as to provide for motion of the blades toward and from each other and simultaneously to rock both blades about the same axis, said supporting and actuating means comprising, in combination, coaxial shafts, one of which is tubular and the other of which telescopes within the tubular shaft, bearings for the remote ends of the respective shafts in which the shafts may rock and also move axially, a sleeve fixed to each respective shaft, means for connecting each picker blade to one, respectively, of said sleeves, cam means operative to rock both sleeves simultaneously about the common axis of the two shafts, and cam means operative to move the sleeves toward and from each other along said common axis.

7. Apparatus according to claim 6, further characterized in that for rocking the sleeves concomitantly about the common axis of the two shafts each sleeve is provided with a radial arm, said arms having aligned holes forming bearings for a rigid shaft which extends through and is free to turn in said holes, a pair of parallel levers, cam means for rocking the last-named levers simultaneously, and adjustable links connecting said levers to the opposite ends of that shaft which passes through the openings in the radial arms of the sleeves.

8. Apparatus according to claim 6, wherein, for moving the sleeves relatively to each other, each sleeve is provided with a peripheral groove; levers, each having a forked end which engages the groove in one of said sleeves, respectively, a constantly rotating barrel cam having two cam grooves in its peripheral surface, each respective lever having a cam-follower element disposed in one of said cam grooves, respectively, said grooves being so contoured as during a portion of a revolution of the cam said levers are rocked in opposite directions, and during another portion of the revolution of the cam the levers are rocked in the same direction.

9. Apparatus according to claim 6, having a constantly rotating barrel cam and the barrel cam having a cam groove at each end, a pair of levers which rock about an axis parallel to that of the barrel cam and which have cam followers which are received in the last-named cam grooves respectively, and means connecting said last-named levers to the sleeves whereby the picker blades are rocked.

10. In a labeling machine wherein a picker, comprising two separable blades, takes a label from a magazine and carries it to a label-affixing point, means operative to move the picker blades toward and from each other, and means operative to shift both picker blades concomitantly, without changing the distance between them, in a direction parallel to the axis about which they rock.

11. In a labeling machine wherein a picker takes labels from a magazine and carries them to a label-affixing point and wherein the picker comprises two separable blades arranged to rock about a pivotal axis between a stationary label magazine and a label-affixing point, and also to move toward and from each other edgewise, and wherein the magazine and label-affixing point are offset laterally, in a direction parallel to the axis about which the picker rocks, and comprising means operative to move the picker blades edgewise toward each other before they enter the magazine and for moving them away from each other when they are at the affixing point, in combination, means operative to position the blades in label-picking relation before they enter the magazine and for moving both blades, concomitantly and without changing the distance between them as they recede from the magazine, along a path such that they avoid contact with other parts as they approach the affixing point.

12. In a labeling machine of the kind which comprises a pair of relatively movable picker blades, means defining an axis about which the blades rock, the blades being coplanar at all times, means operative, at times, to move the blades edgewise toward and from each other and, in combination therewith, means operative, at times, to move both blades concomitantly in the same direction without changing the distance between their adjacent edges.

References Cited by the Examiner

UNITED STATES PATENTS

| | | | |
|---|---|---|---|
| 795,149 | 7/1905 | Miller | 156—490 |
| 2,284,019 | 5/1942 | Powell | 156—491 |

EARL M. BERGERT, *Primary Examiner.*

J. P. MELOCHE, *Assistant Examiner.*